United States Patent
Li

(10) Patent No.: US 11,561,429 B2
(45) Date of Patent: Jan. 24, 2023

(54) DISPLAY MODULE AND DISPLAY DEVICE

(71) Applicants: K-Tronics (Suzhou) Technology Co., Ltd., Jiangsu (CN); BOE Technology Group Co., Ltd., Beijing (CN)

(72) Inventor: Zhongcheng Li, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 46 days.

(21) Appl. No.: 16/812,710

(22) Filed: Mar. 9, 2020

(65) Prior Publication Data

US 2021/0149245 A1 May 20, 2021

(30) Foreign Application Priority Data

Nov. 15, 2019 (CN) .......................... 201921988728.4

(51) Int. Cl.
*G02F 1/1335* (2006.01)

(52) U.S. Cl.
CPC .. *G02F 1/133528* (2013.01); *G02F 1/133502* (2013.01); *G02F 1/133504* (2013.01); *C09K 2323/03* (2020.08); *G02F 2202/22* (2013.01)

(58) Field of Classification Search
CPC ......... G02F 1/133528; G02F 1/133502; G02F 1/133504; G02F 2202/22; C09K 2323/03–035
See application file for complete search history.

(56) References Cited

U.S. PATENT DOCUMENTS

| | | | |
|---|---|---|---|
| 2005/0134749 A1* | 6/2005 | Abileah | G02F 1/133502 349/16 |
| 2007/0229804 A1* | 10/2007 | Inoue | G02B 5/0242 356/213 |
| 2010/0197187 A1* | 8/2010 | Naraba | G02F 1/1303 445/25 |
| 2012/0300304 A1* | 11/2012 | Collier | C03C 21/002 359/599 |
| 2013/0027780 A1* | 1/2013 | Iwata | G02B 1/118 359/601 |
| 2013/0079468 A1* | 3/2013 | Kanemura | C08F 297/026 525/89 |
| 2015/0331149 A1* | 11/2015 | Bookbinder | G02B 1/11 359/601 |
| 2016/0154272 A1* | 6/2016 | Kim | G02B 27/286 349/68 |
| 2016/0178958 A1* | 6/2016 | Son | G02B 5/0215 349/96 |
| 2017/0102486 A1* | 4/2017 | Liu | G02F 1/133528 |
| 2018/0215657 A1* | 8/2018 | Jin | C03C 19/00 |

* cited by examiner

*Primary Examiner* — Sophie Hon
*Assistant Examiner* — Sow-Fun Hon
(74) *Attorney, Agent, or Firm* — Westman, Champlin & Koehler, P.A.

(57) ABSTRACT

A display module and a display device are provided. The display module includes: a display panel; and a polarizer disposed on a light emitting side of the display panel, and the polarizer includes a polarizer body and an atomizing layer disposed on a side of the polarizer body distal to the display panel, and the atomizing layer includes an uneven surface.

5 Claims, 2 Drawing Sheets

DISPLAY MODULE AND DISPLAY DEVICE

CROSS-REFERENCE TO RELATED APPLICATION

The present application claims the benefit of Chinese Patent Application No. 201921988728.4 filed on Nov. 15, 2019 in the National Intellectual Property Administration of China, the whole disclosure of which is incorporated herein by reference.

TECHNICAL FIELD

The present disclosure relates to a field of display technology, and in particular, to a display module and a display device.

BACKGROUND

With continuous development of display technology, a price of the display device shows a trend of gradually decreasing. Therefore, reducing manufacturing cost of the display device has become a major concern of all sorts of big manufacturers.

SUMMARY

For the above problems, embodiments of the present disclosure are presented to provide a display module and a display device so as to overcome the aforementioned problems or at least partially address the aforementioned issues.

An embodiment of the present disclosure provides a display module, including: a display panel; and a polarizer disposed on a light emitting side of the display panel and including a polarizer body and an atomizing layer disposed on a side of the polarizer body distal to the display panel, the atomizing layer including an uneven surface.

In some embodiments, the uneven surface of the atomizing layer is provided with a plurality of protrusions or depressions.

In some embodiments, the plurality of protrusions or depressions have hemispherical shape.

In some embodiments, a haze of the polarizer is 20% to 30%.

In some embodiments, a thickness of the polarizer is 0.1 mm to 0.15 mm.

In some embodiments, the display panel is bonded to the polarizer body through an optical adhesive.

In some embodiments, the atomizing layer is a resin layer doped with an antistatic agent.

In some embodiments, the resin layer is further doped with diffusion particles.

In some embodiments, the resin layer is a photo-curable resin layer, and a refractive index of the photo-curable resin layer is greater than or equal to 1.49.

An embodiment of the present disclosure also provides a display device, including the display module according to any embodiment as mentioned above.

In some embodiments, the display device further includes a cover plate covering the display module, the cover plate has an anti-glare layer on a side of the cover plate distal to the display module.

In some embodiments, a surface of the cover plate facing the display module is separated from the atomizing layer of the polarizer in the display module by an air layer.

In some embodiments, a gap between the surface of the cover plate facing the display module and the atomizing layer of the polarizer in the display module is 0.8 mm to 3 mm. In some embodiments, the uneven surface of the atomizing layer is provided with a plurality of protrusions or depressions.

In some embodiments, the plurality of protrusions or depressions have hemispherical shape.

In some embodiments, a haze of the polarizer is 20% to 30%.

In some embodiments, a thickness of the polarizer is 0.1 mm to 0.15 mm.

In some embodiments, the atomizing layer is a resin layer doped with an antistatic agent.

In some embodiments, the resin layer is further doped with diffusion particles.

In some embodiments, the resin layer is a photo-curable resin layer, and a refractive index of the photo-curable resin layer is greater than or equal to 1.49.

BRIEF DESCRIPTION OF THE DRAWINGS

In order to illustrate the technical solutions of the embodiments of the present disclosure more clearly, drawings used in the description of the embodiments of the present disclosure are briefly introduced below. Obviously, the drawings in the following description are just some embodiments of the present disclosure. For those of ordinary skilled in the art, other drawings can be obtained based on these drawings without any creative efforts.

DETAILED DESCRIPTION OF EMBODIMENTS

Technical solutions of embodiments of the present disclosure will be clearly and completely described below with reference to accompanying drawings in the embodiments of the present disclosure. Obviously, the described embodiments are part of the embodiments of the present disclosure, but not all of the embodiments. Based on the embodiments in the present disclosure, all other embodiments obtained by an ordinary skilled person in the art without any creative efforts shall fall within the protection scope of the present application.

Figure 1:
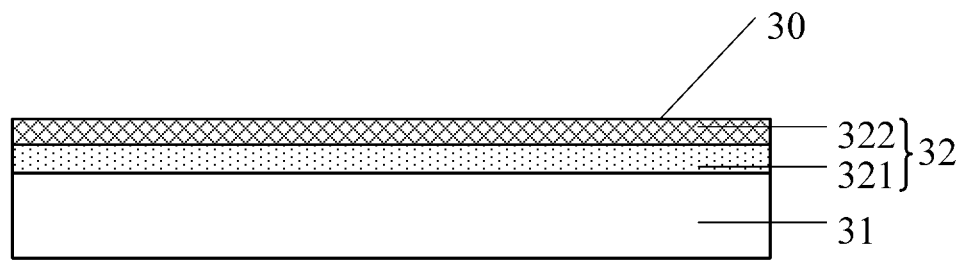
FIG. 1 shows an illustrative structure of a display module in an embodiment of the present disclosure.

FIG. 1 shows an illustrative structure of a display module in an embodiment of the present disclosure.

An embodiment of the present disclosure provides a display module, including: a display panel 31 and a polarizer 32 disposed on a light emitting side of the display panel 31. The polarizer 32 includes a polarizer body 321 and an atomizing layer 322 disposed on a side of the polarizer body 321 away from the display panel 31. The "atomizing layer" used herein refers to a layer with a roughened surface being processed. The atomizing layer 322 has an uneven surface 30 (such as a frosted surface), and the surface 30 is located on a side of the atomizing layer 322 distal to the polarizer body.

The atomizing layer 322 is made on one surface of the polarizer body 321 to form a polarizer 32. A surface of the polarizer 32 on which the atomizing layer 322 is not formed (that is, the other surface of the polarizer body 321) is attached to the display panel 31 so that the polarizer 32 is located on the light emitting side of the display panel 31 so as to obtain a display module. When a cover plate is subsequently used to cover the display module, a surface of the cover plate is arranged to face towards the atomizing layer 322 of the display module. It is not easy to generate adsorption between the display module and the cover plate because the atomizing layer 322 includes an uneven surface (for example, a plurality of protrusions or depressions are provided on the surface), and thereby prevent the display device from generating iridescence and improve a quality of the display device.

The polarizer body 321 may have smooth surfaces. The polarizer body 321, for example, may have a structure that is the same or similar with a structure of an existing polarizer. The polarizer 32 may be any kind of polarizer, for example linear polarizer, circular polarizer, etc. The display panel 31 may be, for example, an LCD (Liquid Crystal Display) display panel or an OLED (Organic Light-Emitting Diode) display panel.

Figure 3:
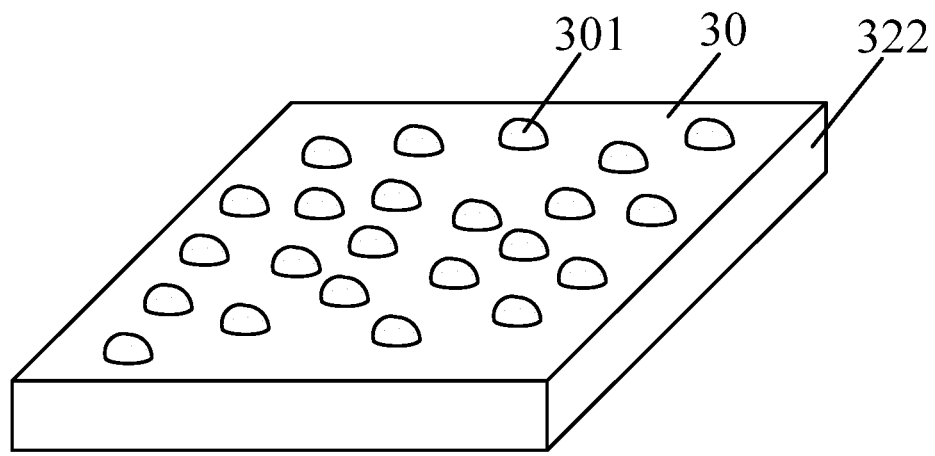
FIG. 3 schematically shows an illustrative structure of an uneven surface of an atomizing layer in a polarizer in a display module or a display device according to an embodiment of the present disclosure.
Figure 4:
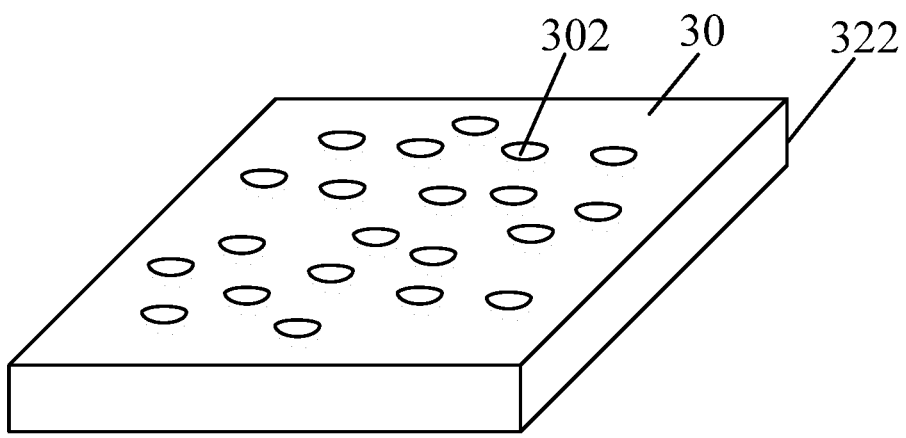
FIG. 4 schematically shows another illustrative structure of an uneven surface of an atomizing layer in a polarizer in a display module or a display device according to an embodiment of the present disclosure.

It should be noted that FIG. 1 only shows the specific location of the atomizing layer 322, shapes of microstructures specifically contained in the uneven surface of which are not illustrated in FIG. 1. It can be understood that any shape of the microstructures may be formed onto atomizing layer 322. As shown in FIGS. 3 and 4, the uneven surface 30 may be, for example, provided with a plurality of protrusions 301 or depressions 302. It should be noted that the uneven surface may be provided with both protrusions 301 and depressions 302 in an embodiment of the present disclosure. In the example illustrated in FIG. 3, a shape of each protrusion 301 is a hemispherical shape, the spherical surface of which faces away from the display panel 31. The uneven surface 30 of the atomizing layer 322 may be formed on a surface of the polarizer body 321 by randomly and uniformly distributing a plurality of hemispherical shape of protrusions with different sizes or the same size on the polarizer body 321. In the example illustrated in FIG. 4, a shape of each depression 302 is also a hemispherical shape, and the uneven surface 30 of the atomizing layer 322 can be formed as well.

In some embodiments, a haze of the polarizer 32 may be, for example, 20% to 30%. Herein, the haze refers to a percentage of an intensity of transmitted light deviating from an incident light at more than 2.5° to an intensity of total transmitted light. The larger the haze is, the lower the transparency of the polarizer is and the rougher the surface is.

The haze of the polarizer 32 may also be represented as a denotation of ability of the polarizer 32 for scattering a light. The greater the haze of the polarizer 32 is, the stronger the ability of the polarizer 32 for scattering the light is.

The surface of the polarizer 32 becomes rough by making the atomizing layer 322 including an uneven surface 30 on the polarizer body 321, so that the haze of the polarizer 32 can reach 20% to 30%. The haze of the polarizer 32 can also be understood as a roughness of the surface of the polarizer 32.

In an embodiment of the present disclosure, a thickness of the polarizer 32 is 0.1 mm to 0.15 mm.

Specifically, the thickness of the polarizer 32 refers to a thickness of the polarizer 32 in a direction perpendicular to the display panel 31.

The thickness of the formed polarizer 32 is not significantly different from that of an existing polarizer by setting the thickness of the polarizer 32 between 0.1 mm and 0.15 mm even if the atomizing layer 322 is provided on the polarizer body 321, and thereby an oversize thickness of the display device formed finally is avoided.

In some embodiments, the display panel 31 may be bonded to the polarizer 32 through an optical adhesive. Specifically, the display panel 31 is bonded to the polarizer body 321 in the polarizer 32 through the optical adhesive.

Specifically, the atomizing layer 322 may be fabricated on the polarizer body 321 by using a nano-imprint process or a coating process so as to form the polarizer 32.

The atomizing layer 322 may be a resin layer doped with an antistatic agent if the polarizer 32 is fabricated by the nano-imprint process.

Firstly, the antistatic agent is mixed uniformly with a resin material to obtain a resin material doped with the antistatic agent, and the resin material doped with the antistatic agent is uniformly coated on one surface of the polarizer body 321. Next, a curing treatment is carried out, an imprint glue is coated on the resin material doped with the antistatic agent after curing, the imprint glue is imprinted by an imprint template to obtain a desired imprinted pattern. And then, the resin material doped with the antistatic agent is etched based on the imprinted pattern so that the atomizing layer 322 is obtained on the polarizer body 321. The atomizing layer 322 includes a plurality of uneven microstructures formed through etching according to the imprinted pattern. At last, the remaining imprinted glue is removed. In some embodiments, the resin layer is a photo-curable resin layer, and a refractive index of the photo-curable resin layer is greater than or equal to 1.49.

Figure 5:
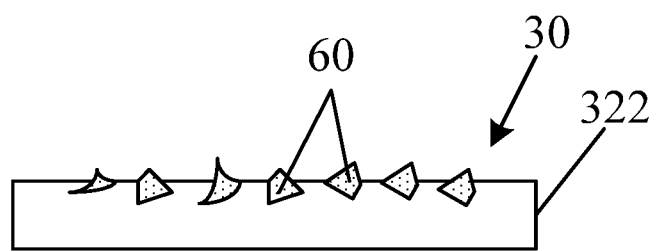
FIG. 5 schematically shows an example of an atomizing layer.

If the polarizer 32 is made by using the coating process, in addition to antistatic agents doped in the resin layer, diffusion particles 60 may also be doped in the resin layer (refer to FIG. 5, the diffusion particles may have various shapes), that is, the atomizing layer 322 is a resin layer doped with the antistatic agent and the diffusion particles.

Firstly, the antistatic agent and the diffusion particles are mixed uniformly with the resin material to obtain a resin material doped with the antistatic agent and the diffusion particles. The resin material doped with the antistatic agent and the diffusion particles is coated uniformly on one surface of the polarizer body 321. Next, a curing treatment is carried out so that the atomizing layer 322 is obtained on the polarizer body 321, and the atomizing layer 322 includes a plurality of uneven microstructures formed by coating the diffusion particles. The resin layer is a photo-curable resin layer, and a refractive index of the photo-curable resin layer is greater than or equal to 1.49.

In an embodiment of the present disclosure, the resin layer is photo-curable resin layer. The curing treatment refers to usage of ultraviolet light to irradiate so that the photo-curable resin layer is cured, consequently the antistatic agent and the diffusion particles doped in the photo-curable resin layer may be fixedly formed on the polarizer body 321.

The polarizer 32 including the atomizing layer 322 is formed by doping the antistatic agent in the resin layer. A surface of the polarizer 32 on which the atomizing layer 322 is not formed is bonded to the display panel 31 so as to obtain a display module. When the cover plate is subsequently used to cover the display module, the surface of the cover plate is arranged to face towards the atomizing layer 322 of the display module. The atomizing layer 322 is doped with the antistatic agent so that electrostatic adsorption between the display module and the cover plate can be avoided further, and thereby further prevents the display device from generating iridescence.

In addition to the antistatic agent doped in the resin layer, the diffusion particles can also be doped in the resin layer. The diffusion particles are granular plastic material. The atomizing layer 322 is doped with the diffusion particles. The diffusion particles are granular so that the atomizing layer 322 may include an uneven surface to avoid the adsorption between the display module and the cover plate.

It should be noted that the polarizer 32 is formed by the nano-imprint process, and the uneven surfaces contained in the atomizing layer 322 in said polarizer 32 may be formed more efficiently; and that the polarizer 32 is formed by the coating process, the manufacturing process of which is simple.

In an embodiment of the present disclosure, the polarizer disposed on the light emitting side of the display panel includes the polarizer body and the atomizing layer disposed on the side of the polarizer body distal to the display panel. The atomizing layer includes a plurality of uneven microstructures. The polarizer with the atomizing layer is used to replace an original polarizer to obtain the display module. When the cover plate is subsequently used to cover the display module, it is not easy to generate adsorption between the display module and the cover plate because a plurality of uneven microstructures are provided on the surface of display module facing towards the cover plate, and thereby prevent the display device from generating iridescence and improve the quality of the display device.

An embodiment of the present disclosure also provides a display device including the display module in the aforementioned embodiments.

Figure 2:
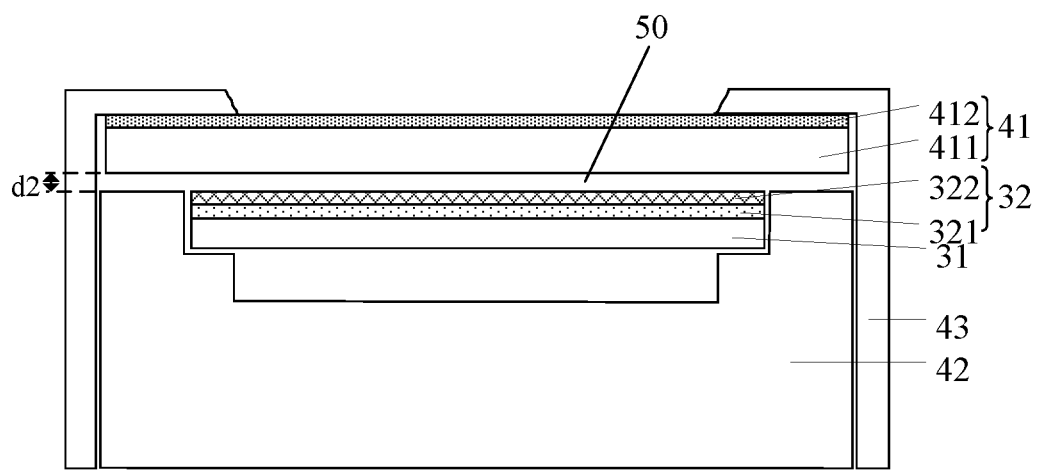
FIG. 2 shows an illustrative structure of a display device in an embodiment of the present disclosure.

FIG. 2 shows an illustrative structure of a display device in an embodiment of the present disclosure. As shown in FIG. 2, the display device further includes a cover plate 41 for covering the display module, and the cover plate 41 has an anti-glare structure on a side of the cover plate 41 away from the display module.

The cover plate 41 includes a cover plate body 411 and an anti-glare layer 412 disposed on a side of the cover plate body 411 distal to the polarizer 32. The anti-glare layer 412 includes multiple anti-glare structures capable of scattering light so that the cover plate 41 has the anti-glare structures on the side of the cover plate 41 away from the display module.

The anti-glare layer 412 is used to diffusely reflect incident light so as to reduce an interference of external light on an image displayed by the display device, and thereby ensure the resolution of the image displayed on the display device upon viewed.

In an example shown in FIG. 2, the anti-glare layer is not provided on a side of the cover plate body 411 near the polarizer 32, that is, a surface on a side of the cover plate 41 near the polarizer 32 is smooth. However, the atomizing layer 322 includes an uneven surface provided on the polarizer 32 at a side of the atomizing layer 322 distal to the display panel 31, that is, the display module has an uneven surface (for example, a plurality of protrusions or depressions are provided) on its surface facing towards the cover plate, therefore, it is not easy to generate adsorption between the display module and the cover plate 41, and thereby prevent the display device from generating iridescence and improve the quality of the display device. Compared with disposing the anti-glare layers on two surfaces, for example, upper and lower surfaces, of the cover body 411, disposing the anti-glare layer 412 on only one surface, for example, an upper surface in FIG. 2, of the cover body 411 can reduce the cost and decrease the thickness of the display device.

In some examples, the anti-glare layer 412 may be manufactured on the cover plate body by using a spray process, a coating film process or an etching process so as to form the cover plate 41.

It is assumed that the spray process is used to fabricate the cover plate 41. Firstly, a cover plate body 411 is provided, and then the cover plate body 411 is sprayed by using a spraying equipment to form a coating layer containing optical astigmatism particles on the cover plate body 411, and thereby the anti-glare layer 412 is fabricated on the cover plate body 411.

It is assumed that the coating film process is used to fabricate the cover plate 41. Firstly, a cover plate body 411 is provided, and then a special processed film is added on the cover plate body 411, a surface of the said film is processed with micro-unevenness, and thereby the anti-glare layer 412 is fabricated on the cover plate body 411.

It is assumed that the etching process is used to fabricate the cover plate 41. Firstly, a cover plate body 411 is provided, and then the cover plate body 411 is etched with acidic liquid, and a surface of the cover plate body 411 is etched through chemical reaction to form a plurality of uneven microstructures, so as to fabricate the anti-glare layer 412. The acidic liquid includes hydrofluoric acid and auxiliary additives.

The cover plate 41, in the embodiment of the present disclosure, is a single-sided anti-glare (AG) cover plate, which has a low manufacturing cost. Therefore, when the cover plate 41 is overlaid on the display module in the embodiment of the present disclosure, iridescence on the display device is avoided and the manufacturing cost of the display device can be reduced.

As shown in FIG. 2, the surface of the cover plate 41 facing the display module is separated from the atomizing layer 322 of the polarizer 32 in the display module by an air layer 50, rather than the cover 41 is bonded to the polarizer 32 with adhesive agent. This can save the costs. The gap d2 between the cover plate 41 and the display module (that is, the gap between the surface of the cover plate 41 facing the display module and the atomizing layer 322 of the polarizer 32 in the display module) may be 0.8 mm to 3 mm Specifically, the gap d2 between the cover plate 41 and the polarizer 32 (i.e., the gap between the surface of the cover plate 41 facing the display module and the atomizing layer 322 of the polarizer 32 in the display module) is 0.8 mm to 3 mm. For example, the gap d2 between the cover plate 41 and the display module may be such as 0.8 mm, 1 mm, 2 mm or 3 mm. In contrast, in the case that the polarizer without the atomizing layer 322 is used, the gap between the cover plate and the display module, for example, may be 4 mm to 5 mm. It can be seen that compared with a case that the polarizer without the atomizing layer 322 is used, the gap d2 is significantly reduced in the embodiment of the present disclosure, and thereby the thickness of the display device can be decreased.

As shown in FIG. 2, the display device further includes a backlight module 42 and a frame 43. The frame 43 is used to fix and protect the backlight module 42, the display module and the cover plate 41. The backlight module 42 is used to provide light required by the display device for displaying images.

It should be noted that FIG. 2 shows a liquid crystal display device, which needs a backlight module 42 to provide light for displaying images. Of course, the display device may also be an OLED (organic light emitting diode) display device. In this case, there is no need to provide the backlight module. The organic light emitting diode in the display panel 31 can achieve self-luminous to display images.

The display device is mainly directed to a large-sized display device in the embodiment of the present disclosure. If a single-sided AG cover plate and the polarizer without the atomizing layer are used in the large-sized display device, deformation of the display panel attached with the polarizer will become large. It is easy for the display panel to adsorb the single-sized AG cover plate because of the deformation, so it is easier to produce the iridescence. Therefore, in the embodiment of the present disclosure, the polarizer 32 having the atomizing layer 322 is used to replace a polarizer without atomizing layer, and can effectively suppress iridescence of the display device. Of course, the display device may also be a display device of other sizes, such as, a small-sized display device, etc. in the embodiment of the present disclosure.

In addition, the specific description of the display module may refer to the description of the aforementioned embodiments, which are omitted in the embodiments of the present disclosure.

In an embodiment of the present disclosure, the polarizer disposed on the light-emitting side of the display panel includes the polarizer body and the atomizing layer disposed on the side of the polarizer body distal to the display panel. The atomizing layer includes a surface with uneven microstructures. The polarizer with the atomizing layer is used to replace an original polarizer to obtain the display module. When the cover plate is subsequently used to cover the display module, it is not easy to generate adsorption between the display module and the cover plate because microstructures with a plurality of protrusions and depressions are provided on the surface of display module facing towards the cover plate, and thereby prevent the display device from generating iridescence and improve the quality of the display device.

Various embodiments of the present disclosure may be combined with each other unless there are contradictions between them.

Although preferred embodiments of the present disclosure have been described above, those skilled in the art may make other changes and modifications to the above embodiments once they know the general inventive concepts. Therefore, the attached claims are intended to be construed to include preferred embodiments and all changes and modifications falling within the scope of the embodiments of the present disclosure.

At last, it should be noted that in this text, the terms "include", "comprise" or any other variation thereof is intended to encompass non-exclusive inclusion, such that a process, a method, a product, or a terminal apparatus that includes some elements includes not only those elements, but also other elements explicitly listed, or elements inherent to such a process, a method, a product, or a terminal apparatus. Without more restrictions, the elements defined by the sentence "including one . . . " do not exclude that there are other identical elements in the process, method, product, or terminal apparatus including the elements.

The above is only a specific implementation of the present disclosure, but the scope of protection of the present disclosure is not limited to this. Any person skilled in the art can easily think of changes or replacements within the technical scope disclosed in the present disclosure. It should fall within the protection scope of this disclosure. Therefore, the protection scope of the present disclosure shall be subject to the protection scope of the claims.

What is claimed is:

1. A display device, comprising:
a display module, comprising:
a display panel; and
a polarizer disposed on a light emitting side of the display panel, and comprising:
a polarizer body, and
an atomizing layer disposed on a side of the polarizer body distal to the display panel, wherein, the atomizing layer comprises an uneven surface; and, a cover plate covering the display module,
wherein a surface of the cover plate is arranged to face towards the atomizing layer, and the surface of the cover plate facing the display module is separated from the atomizing layer of the polarizer in the display module by an air layer;
wherein a gap between the surface of the cover plate facing the display module and the atomizing layer of the polarizer in the display module is 0.8 mm to 3 mm, and the surface of the cover plate facing the display module is smooth;
wherein the atomizing layer is a resin layer doped with an antistatic agent;
wherein the resin layer is a photo-curable resin layer that has a refractive index greater than or equal to 1.49;
wherein the uneven surface of the atomizing layer is provided with a plurality of protrusions and a plurality of depressions, and both the protrusions and the depressions have hemispherical shapes; and
wherein the atomizing layer further comprises a plurality of uneven micro-structures of diffusion particles, and is fabricated by using a nano-imprint process comprising:
mixing the antistatic agent with a resin material to obtain a resin material doped with the antistatic agent;
coating the resin material doped with the antistatic agent on a surface of the polarizer body;
carrying out curing treatment;
coating an imprint glue on the resin material doped with the antistatic agent after the curing treatment;
imprinting the imprint glue by an imprint template to obtain an imprinted pattern;
etching the resin material doped with the antistatic agent based on the imprinted pattern so as to obtain the atomizing layer; and
removing the remaining imprinted glue.

2. The display device according to claim 1, wherein the cover plate has an anti-glare layer on a side of the cover plate distal to the display module.

3. The display device according to claim 1, wherein a haze of the polarizer is 20% to 30%.

4. The display device according to claim 1, wherein a thickness of the polarizer is 0.1 mm to 0.15 mm.

5. The display device according to claim 1, wherein the display panel is bonded to the polarizer body through an optical adhesive.

* * * * *